US011469630B2

(12) United States Patent
Chung et al.

(10) Patent No.: US 11,469,630 B2
(45) Date of Patent: Oct. 11, 2022

(54) COMMON LAMINATION COMPONENT FOR ACCOMMODATING MULTIPLE CONDUCTOR GEOMETRIES IN AN ELECTRIC MACHINE

(71) Applicant: BorgWarner Inc., Noblesville, IN (US)

(72) Inventors: Jiwon Chung, Fishers, IN (US); Kirk Neet, Pendleton, IN (US)

(73) Assignee: BorgWarner Inc., Auburn Hills, MI (US)

( * ) Notice: Subject to any disclaimer, the term of this patent is extended or adjusted under 35 U.S.C. 154(b) by 43 days.

(21) Appl. No.: 17/007,714

(22) Filed: Aug. 31, 2020

(65) Prior Publication Data

US 2020/0403462 A1  Dec. 24, 2020

Related U.S. Application Data

(62) Division of application No. 15/489,578, filed on Apr. 17, 2017, now abandoned.
(Continued)

(51) Int. Cl.
*H02K 15/00* (2006.01)
*H02K 1/16* (2006.01)
(Continued)

(52) U.S. Cl.
CPC ............... *H02K 1/165* (2013.01); *H02K 3/12* (2013.01); *H02K 3/345* (2013.01); *H02K 15/00* (2013.01);
(Continued)

(58) Field of Classification Search
CPC .......... H02K 3/12; H02K 1/165; H02K 1/185; H02K 3/34; H02K 3/345; H02K 1/16;
(Continued)

(56) References Cited

U.S. PATENT DOCUMENTS 2,758,230 A   8/1956   Wilhelm
4,896,066 A   1/1990   Tomite
(Continued)

FOREIGN PATENT DOCUMENTS

CN   201758309   3/2011
CN   204597648   8/2015
(Continued)

OTHER PUBLICATIONS

International Search Report and Written Opinion for corresponding case PCT/US2017/027736, dated Sep. 12, 2017.
(Continued)

*Primary Examiner* — Thiem D Phan
(74) *Attorney, Agent, or Firm* — Maginot, Moore & Beck, LLP

(57) ABSTRACT

Rectangular conductor wires are often used in alternator applications requiring a high slot fill to maximize output and efficiency. However for lower output and efficiency applications, round conductor wire may increase cost competiveness in these alternators. A common lamination for a core alternatively accommodates both rectangular conductor wires and round conductor wires for different applications without any other component changes. The lamina has a slot that aligns round wire in a single row within the slot and provides a predetermined clearance from the slot opening. A stator core formed from these laminae has a relatively high slot fill factor when wound with the round wire. The same stator core can be alternatively wound with square wire to increase the slot fill factor even higher. The common lamination results in two stator configurations: a high slot fill version (round wire) and a very high slot fill version (square wire).

14 Claims, 8 Drawing Sheets

Related U.S. Application Data

(60) Provisional application No. 62/323,313, filed on Apr. 15, 2016.

(51) Int. Cl.
*H02K 3/34* (2006.01)
*H02K 3/12* (2006.01)
*H02K 15/085* (2006.01)

(52) U.S. Cl.
CPC ....... *H02K 15/085* (2013.01); *H02K 2213/03* (2013.01); *Y10T 29/49009* (2015.01)

(58) Field of Classification Search
CPC .. H02K 3/30; H02K 15/085; Y10T 29/49009; Y10T 29/49073; Y10T 29/49078; Y10T 29/49208; Y10T 29/53143; Y10T 83/04; H01F 5/06; H01F 5/00
USPC ......... 29/596, 428, 598, 605, 606, 609, 732, 29/734
See application file for complete search history.

(56) References Cited

U.S. PATENT DOCUMENTS

| | | |
|---|---|---|
| 5,587,619 A | 12/1996 | Yumiyama |
| 6,707,211 B2* | 3/2004 | Oohashi ................... H02K 3/12 310/201 |
| 6,873,082 B2 | 3/2005 | Neet |
| 6,882,077 B2 | 4/2005 | Neet |
| 7,239,059 B2 | 7/2007 | Maeda |
| 7,367,106 B2 | 5/2008 | Becherucci |
| 7,788,790 B2 | 9/2010 | Neet |
| 7,994,677 B2 | 8/2011 | Kouda |
| 10,110,078 B2* | 10/2018 | Neet ........................ H02K 3/12 |
| 2003/0164248 A1 | 9/2003 | Kulig |
| 2004/0187293 A1 | 9/2004 | Bradfield |
| 2004/0212268 A1 | 10/2004 | Neet |
| 2005/0110360 A1 | 5/2005 | Neet et al. |
| 2005/0280327 A1 | 12/2005 | Neet |
| 2007/0052317 A1 | 3/2007 | Tanaka |
| 2007/0278889 A1 | 12/2007 | Sasaki |
| 2010/0295390 A1 | 11/2010 | Rau |
| 2011/0025165 A1 | 2/2011 | Naganawa |
| 2015/0001984 A1 | 1/2015 | Bradfield |
| 2015/0054374 A1 | 2/2015 | Neet |

FOREIGN PATENT DOCUMENTS

| | | |
|---|---|---|
| DE | 10302740 A1 | 10/2003 |
| DE | 102014111803 A1 | 2/2015 |
| JP | 2001251819 | 9/2001 |
| WO | 9954985 A1 | 10/1999 |

OTHER PUBLICATIONS

German Office Action for corresponding case PCT/US2017/027736, dated Dec. 1, 2021.

* cited by examiner

COMMON LAMINATION COMPONENT FOR ACCOMMODATING MULTIPLE CONDUCTOR GEOMETRIES IN AN ELECTRIC MACHINE

CROSS-REFERENCE TO RELATED APPLICATIONS

This application is a divisional of U.S. patent application Ser. No. 15/489,578, filed Apr. 17, 2017, which claims the benefit of U.S. Provisional Patent Application No. 62/323,313, filed Apr. 15, 2016, the contents of which are incorporated herein by reference in their entirety.

FIELD

This application relates to the field of electric machines, and particularly to the accommodation of multiple conductor geometries in rotary electric machines.

BACKGROUND

Rotary electric machines operate by exploiting the interaction of the magnetic fields of a rotor and a stator rotating relative to one another. In a common application, the rotor is disposed within and rotatable relative to the stator. The rotor is typically fixed to a shaft mounted for rotation centrally by bearings disposed in a casing that surrounds the stator. These machines include a configuration of insulated wire coils or windings in the stator, which are distributed about the stator central axis. The windings are typically arranged in a progressive sequence to define different electrical phases. The stator windings are typically wound around ferromagnetic poles of the stator core to enhance the strength of the stator's magnetic field. The stator poles generally are tooth-like cross sections that are usually rectangular or trapezoidal, and typically defined by slots in the stator core.

In a polyphase electric motor, flowing current of different phases through a progressive sequence of wire windings in the stator generates rotating magnetic fields in the stator, which impart electromechanical torque to the rotor and its shaft. Conversely, in a polyphase electric generator or alternator, externally forced rotation of the shaft and rotor imparts rotation to magnetic fields that induce current flows in the stator windings.

The stator core may be formed by a stack of interlocked, ferrous laminae, which are typically formed from electrical sheet steel. Each lamina has a central hole with the holes of all the laminae being aligned in the lamina stack to form a stator core central bore having a central axis. Thus, the stator core may be a unitary annular member with its central bore defining a radial internal bore face that is generally cylindrical and centered about the central axis. The radial internal bore face is provided with the generally axially extending, elongate slots formed by aligned, notched portions of the lamina holes that define the stator poles. The stator slots pass axially through the lamina stack adjacent the central bore since they extend over the entire axial length of the lamina stack and are open radially on an internal side and the two opposite axial ends.

The slots formed by the lamina stack typically lie in planes that intersect along and contain the stator central axis, but the slots can also be inclined with respect to central axis. The stator slots are typically distributed at an even pitch about the stator central axis. Relative to the stator, radial and axial directions mentioned herein are respective to the stator central axis, and the stator slots generally extend radially from the central bore face into the stator core and axially along the bore length. Thus, each stator core slot has a generally axial length dimension extending along the length of the stator core bore, a width dimension extending circumferentially about the central axis between a pair of adjacent stator core teeth, and a radial depth dimension extending between the slot opening proximate the stator core central bore and the slot bottom.

Elongate electrical conductors that define the stator coil windings are disposed in and extend along the stator slots. By virtue of the conductors being routed through the stator slots, they are wrapped about the stator poles. Typically, a stator slot insulator insert is located between the conductors and the walls of the stator slots to ensure electrical isolation of the stator windings from the stator core. Typically, the insulator insert is formed of a flexible, electrically insulative sheet material such as a paper or plastic that is inserted into the slot before a conductor is installed therein. The sheet material forms an electrically insulative layer between the conductors and their respective stator slot.

In a polyphase rotary electric machine, the stator coil windings include a plurality (typically three, five, six, or seven) of different phase windings each formed of elongate electrical conductor material such as a copper magnet wire or bar. The conductor cross-section is typically circular or rectangular (including square), or oval. Round wire of conventional sizes may be used for the conductors. Optionally, thick bar conductors can be used for making a wire coil with a designed current-carrying capacity requiring fewer turns than is possible with smaller sized round wire.

Each stator slot may accommodate multiple, small diameter wire segments that are wound in bulk and rather randomly oriented and located, and typically cross over each other, within the slot. Examples of such windings are well-known to those having ordinary skill in the relevant art. Alternatively, the stator slots may have a depth and/or width that is a multiple of the cross-sectional dimension of the conductor, in the slot's radial and/or circumferential direction. In the example of a three-phase stator, multiple electrical conductor segments may be housed within each of the stator slots with the electrical conductors arranged in a predetermined winding pattern to form the stator winding.

The particular winding patterns of stator windings can vary considerably between different machine designs and include, for example, standard-wind configurations, S-wind configurations, or segmented conductor configurations. S-wind configurations typically include a continuous length of wire that is wound in an out of the various slots of the stator, where end loops connect a in-slot portions in one layer to an in-slot portion in the same layer, to form a complete winding. The wire includes relatively straight lengths that are positioned within the slots of the core portion and curved lengths that extend between in-slot portions at the ends of the core portion. Similarly, in a segmented winding configuration, the windings typically comprise a plurality of segmented conductors which include in-slot portions and ends that are connected together. The in-slot portions of the conductors are positioned in the stator slots, and the ends of the conductors are connected to form windings for the electric machine.

It is known that increasing the fill of a conductor material in a stator slot improves both the performance and efficiency of an electrical machine. Such high slot fill stators often include rectangular shaped conductors that are aligned single file in one radial row in each slot and that fit closely to the width of the insulated, rectangular shaped core slots.

The use of rectangular wires in high slot fill stator applications can, however, increase the complexity of placing the winding in the stator. In addition, the cost per kilogram of rectangular wire is significantly more than the cost per kilogram of round wire. Thus, for applications requiring less output and efficiency, the use of round wire instead of rectangular or square wire in the same electrical machine could provide significant cost savings by taking advantage of existing technologies, such as current S-wind technology. However, existing high slot fill applications incorporate stator slot geometries that often only accept rectangular wire.

Accordingly, it would be advantageous to provide a common lamination component for electric machines which alternatively accommodates both rectangular or square wire and round wire for different applications without the need for any other component changes in the electrical machine.

SUMMARY

A stator core for an electric machine in one embodiment includes a core body having a plurality of teeth, adjacent teeth of the plurality of teeth defining respective slots in the core body, each slot having a slot depth in a respective direction along which the teeth extend from the core body and a slot width in a respective direction along which the teeth are spaced circumferentially from each other, the core body has a configuration in which a plurality of elongate wire segments having a round cross section are arranged in single file within each slot, the round cross section having a diameter that approximates the slot width, the slot depth has a range defined by the equation $(N*\emptyset)+0.2 \leq D_C' \leq (N+1)*\emptyset$ where N equals the number of the wire segments in the slot and θ equals the diameter of the second wire segments.

Two stator core assemblies for respective electric machines in one embodiment includes a first stator core and a second stator core that is identical to the first stator core, each stator core having a plurality of teeth with adjacent teeth of the plurality of teeth defining respective slots, the first stator core has a first plurality of elongate wire segments arranged in single file within in each slot, the first wire segments having a rectangular cross section, and the second stator core has a second plurality of elongate wire segments arranged in single file within each slot, the second wires segments having a round cross section.

A method of producing a plurality of stator assemblies in one embodiment includes forming a plurality of identical cores, each core having a plurality of teeth, adjacent teeth of the plurality of teeth defining respective slots in the core body, winding a first core of the plurality of cores with a first plurality of elongate wire segments, the first wire segments having a rectangular cross section and are arranged in single file within in each slot, the rectangular cross section having a cross-sectional dimension that approximates a slot width of the slot, winding a second core of the plurality of cores with a second plurality of elongate wire segments, the second wires segments having a round cross section and are arranged in single file within each slot, the round cross section having a diameter that approximates the slot width, the wound first core has a first slot fill factor and the wound second core has a second slot fill factor, the second slot fill factor within 10 percent of the first slot fill factor.

DETAILED DESCRIPTION

Figure 1:
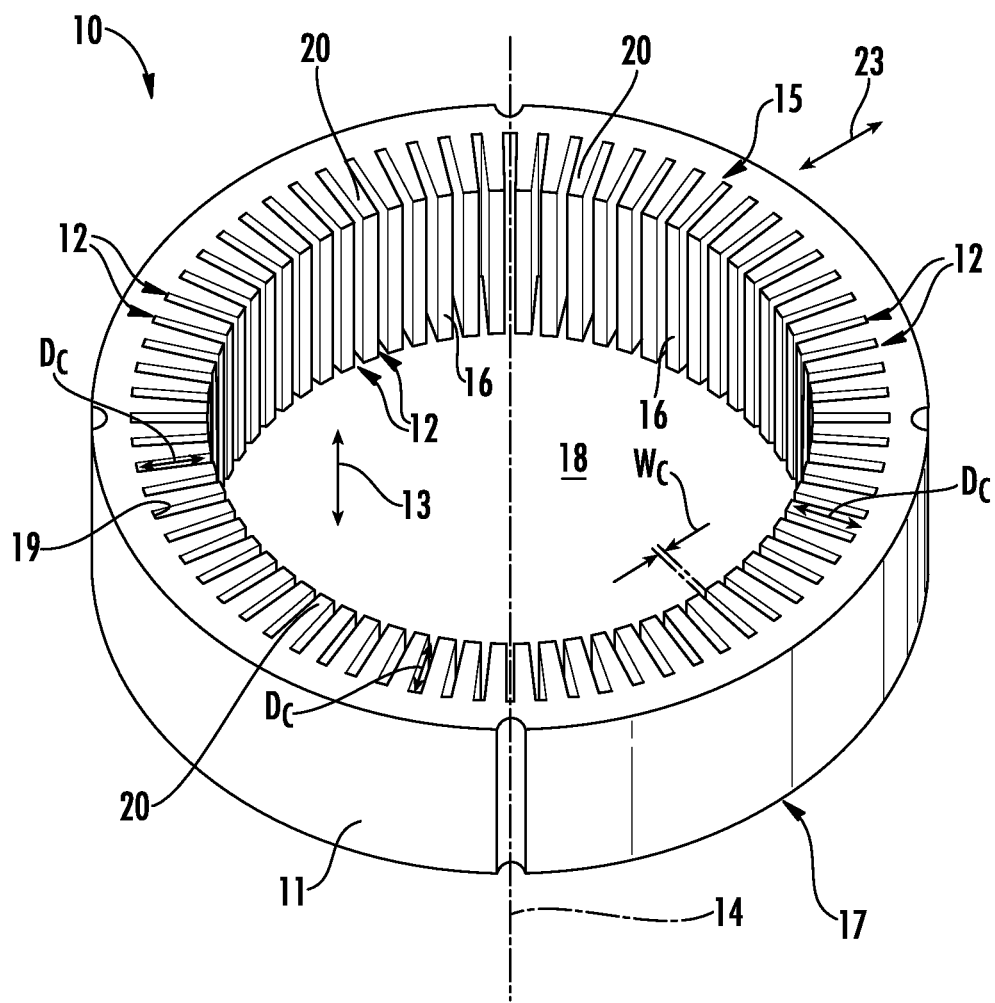
FIG. 1 shows a perspective view of a high slot fill core of a prior art electric machine.
Figure 2:
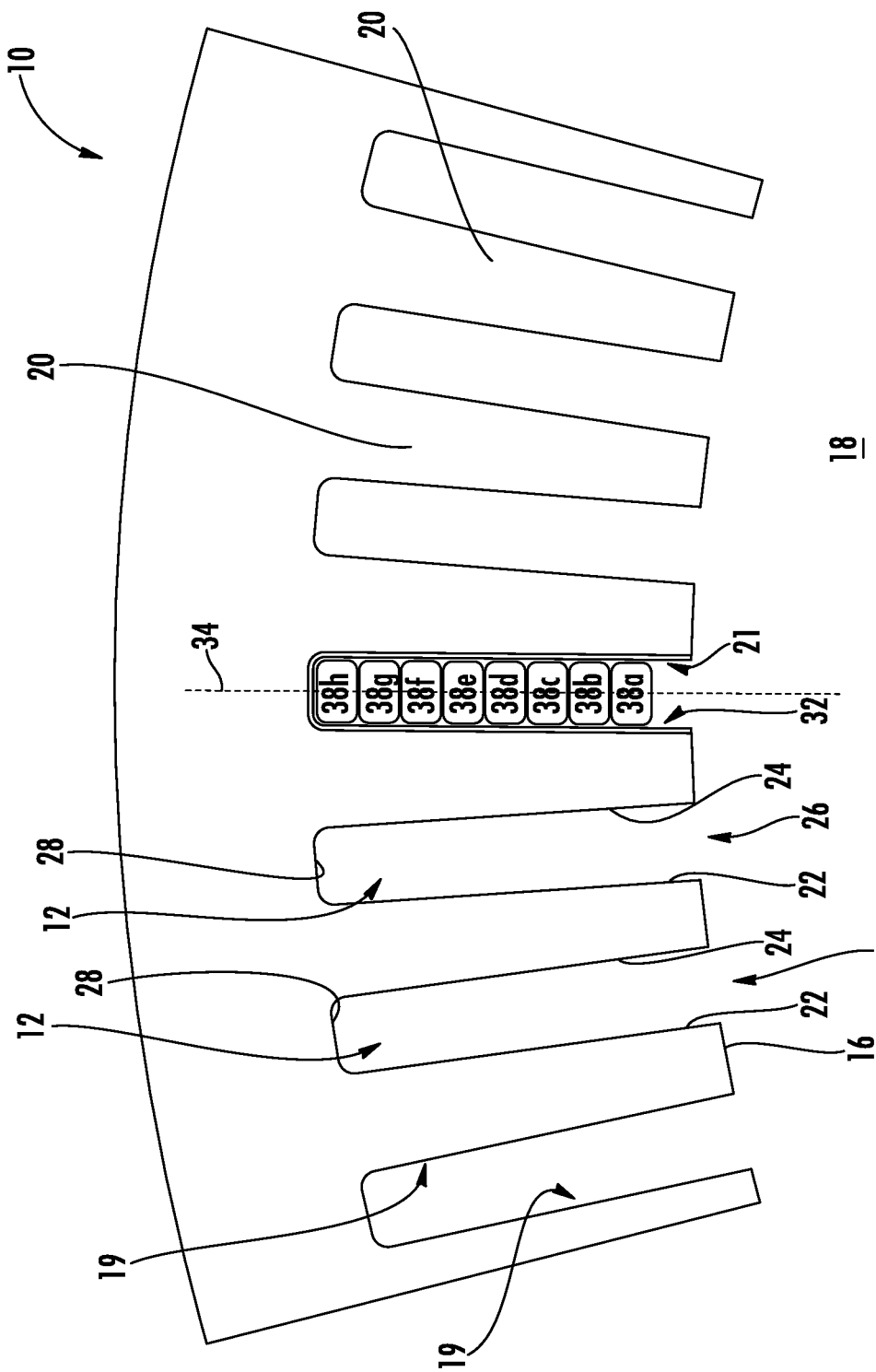
FIG. 2 shows a cross-sectional view of a portion of the core of FIG. 1 with at least one slot of the core including a plurality of rectangular conductors.

FIGS. 1 and 2 depict a prior art stator core 10 for use in a three-phase rotary electric machine. The core 10 has a core body 11 that includes a number of core slots 12 arranged about a central axis 14 with each of the core slots 12 associated with one of the three current phases. This association progressively repeats itself in sequence around a circumferential inner surface 16 of the core 10, which defines a substantially cylindrical bore 18 through the core 10. The core slots 12 extend in a direction, indicated by an arrow 13, parallel to the central axis 14 of the core 10 between a first end 15 and a second end 17 thereof. As used herein, an "axially upward direction" is defined as moving toward the first end 15 of the core 10 and an "axially downward direction" is defined as moving toward the second end 17 of the core 10.

The core slots 12 are equally spaced around the circumferential inner surface 16 of the stator core 10 and respective inner surfaces 19 of the core slots 12 are substantially parallel to the central axis 14. The core slots 12 have a depth $D_C$ along a radial axis, indicated by an arrow 23, and are configured to receive a stator winding, discussed in more detail below. As used herein, a "radial inward direction" is defined as moving towards the central axis 14 of the core 10 and a "radial outward direction" is defined as moving away from the central axis 14.

Figure 3:
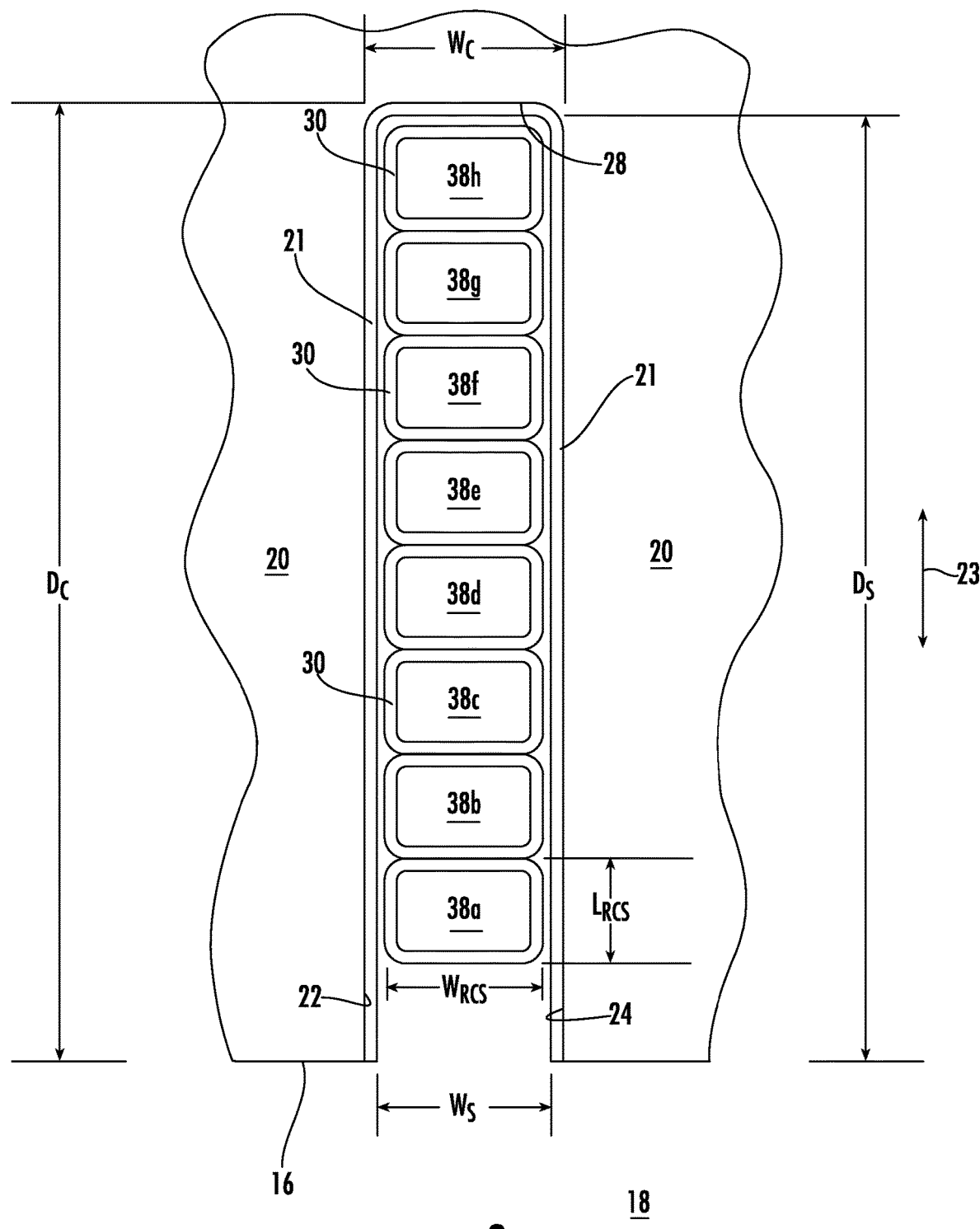
FIG. 3 shows an enlarged view of the slot of FIG. 2 illustrating the features of the slot and the rectangular conductors in more detail.

The core 10 is formed of a stack of aligned, interconnected electrical steel laminae, which define the circumferential inner surface 16 and the core slots 12. The following features described with reference to the "core" or "core body" also describe features of individual lamina since the stack of laminae forms the core. Similarly, figures of the present application that depict cross-sections of the "core" or "core body" can be interpreted as depicting cross-sections of individual lamina. The core slots 12 are separated from one another by stator poles or teeth 20 formed by the lamina stack. As viewed axially along arrow 13, the longitudinal inner surfaces 19 of the core slots 12 are generally U-shaped with approximately parallel sides 22, 24. The core slot sides 22, 24 extend in the radial outward direction from a slot opening 26 in the circumferential inner surface 16. As best shown in FIG. 3, the depth Dc of each core slot 12 extends from the slot opening 26 at the circumferential inner surface 16 to a core slot bottom 28 that is spaced in the radial outward direction from the slot opening 26.

With reference to FIGS. 2 and 3, the core slots 12 are each fitted with respective insulation sleeves 21 that electrically insulate one or more elongate segments of copper magnet wire conductors 38a-h positioned in the core slots 12 from the core 10. The wire conductors 38a-h shown in FIGS. 2 and 3 each have a rectangular cross-sectional shape with a length $L_{RCS}$ extending substantially parallel to the radial axis 23 and a width $W_{RCS}$ extending substantially perpendicular to the radial axis 23 between the parallel sides 22, 24. The cross-sectional area of each of the rectangular conductors 38a-h is substantially equal. The rectangular conductors 38a-h are aligned in a single row by the respective parallel sides 22, 24 of the core slots 12. As shown, it is common that the rectangular shaped conductors may include radii on the corners intermediate two adjacent edges.

FIG. 3 shows an enlarged cross-sectional view of one of the core slots 12 of the core 10 with eight rectangular conductors 38a-h positioned therein. The rectangular conductors 38a-h may be positioned in any configuration, including S-wind or segmented conductor configurations. In the configuration shown, each conductor 38a-h is separated from neighboring conductors in the core slot 12 by at least one insulation layer 30 and from the core 10 by the insulation sleeve 21. The insulation layer 30 and the insulation sleeve 21 each have a substantially uniform thickness. As used herein, "substantially uniform thickness" means a thickness in which deviations across integral surfaces of an element from which the thickness is measured are minimized by known manufacturing methods. The length $L_{RCS}$ and the width $W_{RCS}$ of each the rectangular conductors 38a-h referred to herein includes the thickness of the insulation layer 30. As shown in FIG. 3, the insulation sleeve 21 is positioned along the parallel sides 22, 24 and the core slot bottom 28 so as to substantially surround the conductors 38a-h in each of the slots 12 and thus defines a sleeve slot 32 with a sleeve slot width $W_S$ and a sleeve slot depth $D_S$.

The sleeve slot width $W_S$ at the slot openings 26 is slightly larger than the width $W_{RCS}$ of the rectangular conductors 38a-h so as to permit the conductors 38a-h to be inserted radially into the core slots 12. The circumferential spacing between the adjacent teeth 20 may be consistent along the depth $D_C$ or the circumferential spacing may widen slightly in the radial outward direction from the opening 26 to a width $W_C$ of the core slot 12 defined between the interfacing parallel sides 22, 24 of the circumferentially adjacent teeth 20. The stator winding may be prepared using any variation of a conventional technique suitable for rectangular wire, and the rectangular conductors 38a-h are inserted either individually or as a group into their respective core slot 12 through its opening 26.

When viewed along a cross-sectional plane situated perpendicular to the central axis 14, each core slot 12 and sleeve slot 32, and the common opening 26 thereto are centrally positioned about a slot radial centerline 34 (FIG. 2). The difference in the core slot width $W_C$ and the sleeve slot width $W_S$ is substantially equivalent to twice the thickness t (i.e., 2t) of the insulation sleeve 21 that lines the core slot 12 and defines the interior of the sleeve slot 32. The insulation sleeve 21 is a known, flexible, dielectric material layer having thermal properties suitable for conductively transferring heat between the rectangular conductors 38a-h and the core 10. As mentioned above, the sleeve 21 may be made of plastic or paper sheeting, for example. As shown, each sleeve 21 extends continually along the perimeter of its respective core slot 12 and terminates at the circumferential inner surface 16.

The core slot width $W_C$ and the insulation sleeve thickness t are such as to allow unrestricted radial insertion of the rectangular conductors 38a-h into each core slot 12, between the slot walls defined by the interfacing, parallel surface portions of its respective insulation sleeve 21. Thus, $W_S=W_C-2t$, and approximates the width $W_{RCS}$ of the rectangular conductors 38a-h. There is typically a clearance of, for example, from about 0.1 to 0.8 mm between the sleeve slot width Ws and the width $W_{RCS}$ of the rectangular conductors 38a-h, the clearance being comparatively much smaller than the width $W_{RCS}$ of the rectangular conductors 38a-h. In the embodiment depicted in FIGS. 2 and 3, the insulation sleeve thickness t is about 0.125 mm and the core slot width $W_C$ is about 2 mm such that sleeve slot width is 1.75 mm (2 mm−(2*0.125 mm)). A rectangular conductor with a width $W_{RCS}$ of about 1.6 mm will have approximately 0.15 mm of clearance (1.75 mm−1.6 mm) between the parallel walls of the insulation sleeve 21. Thus, a single file arrangement of the rectangular conductors 38a-h is maintained along the depth $D_S$ of the sleeve slot 32 with the surfaces of the arranged rectangular conductors 38a-h extending parallel with the width $W_{RCS}$ of the conductors in abutment with one another.

One issue with the core 10 depicted in FIGS. 1-3 is that the core slots 12 are specifically configured to accept a specific number of rectangular wire conductors to achieve a desired performance characteristic. This limitation is acceptable for some applications of S-wind electrical machines since rectangular wire is typically used for high slot fill applications in order to achieve maximized output and efficiency from the machine. However, there are many applications requiring lower output and efficiency in which round wire could be used instead of rectangular or square wire in order to take advantage of cost savings associated with use of common S-wind technology and lamination design.

There are numerous design considerations in standardizing a lamination slot design that alternatively accommodates both rectangular wires and round wires. For instance, round wire can be desirable over square wires as it is much easier to insulate and therefore significantly less expensive to manufacture. As is known, square wire can be desirable over round wire in some applications because the cross-sectional area is higher and, therefore, the slot fill is higher, which improves performance and efficiency while lowering stator temperature. A lamination with a slot width that is too wide is not desirable because the teeth will be thin and become easily saturated with flux. A lamination with a slot with that is too narrow is not desirable because the wire will become too thin and the current density of the wire will be too high.

It has been determined that a desirable number of wires per slot is five to seven. However, windings with odd numbers of wires can be difficult to manufacture, so a particularly desirable number of wires per slot is six. For a 12V system, the equation V=N*d(phi)/d(t), where V=induced voltage, N=number of electrical turns, phi=magnetic flux, and t=time, suggests that six electrical turns may be an excessive number of turns for an electrical machine. Moreover, the rotor poles are typically twelve to sixteen poles due to manufacturing limitations. As is known, the number of poles and the surface linear speed of the rotor determine d(phi)/d(t). Thus, to achieve the proper V for a 12V system, the number of poles times the number of turns for a high slot fill wye-wound electrical machine is typically around forty-eight, and the number of electrical turns is typically three or four. To achieve three or four electrical turns with a six wire-in-a-slot stator, the winding could be bifilar resulting in three turns, or the winding could be delta-connected, resulting in three and one-half effective-wye turns since delta effective wye turns equals turns/1.734.

Figure 4:
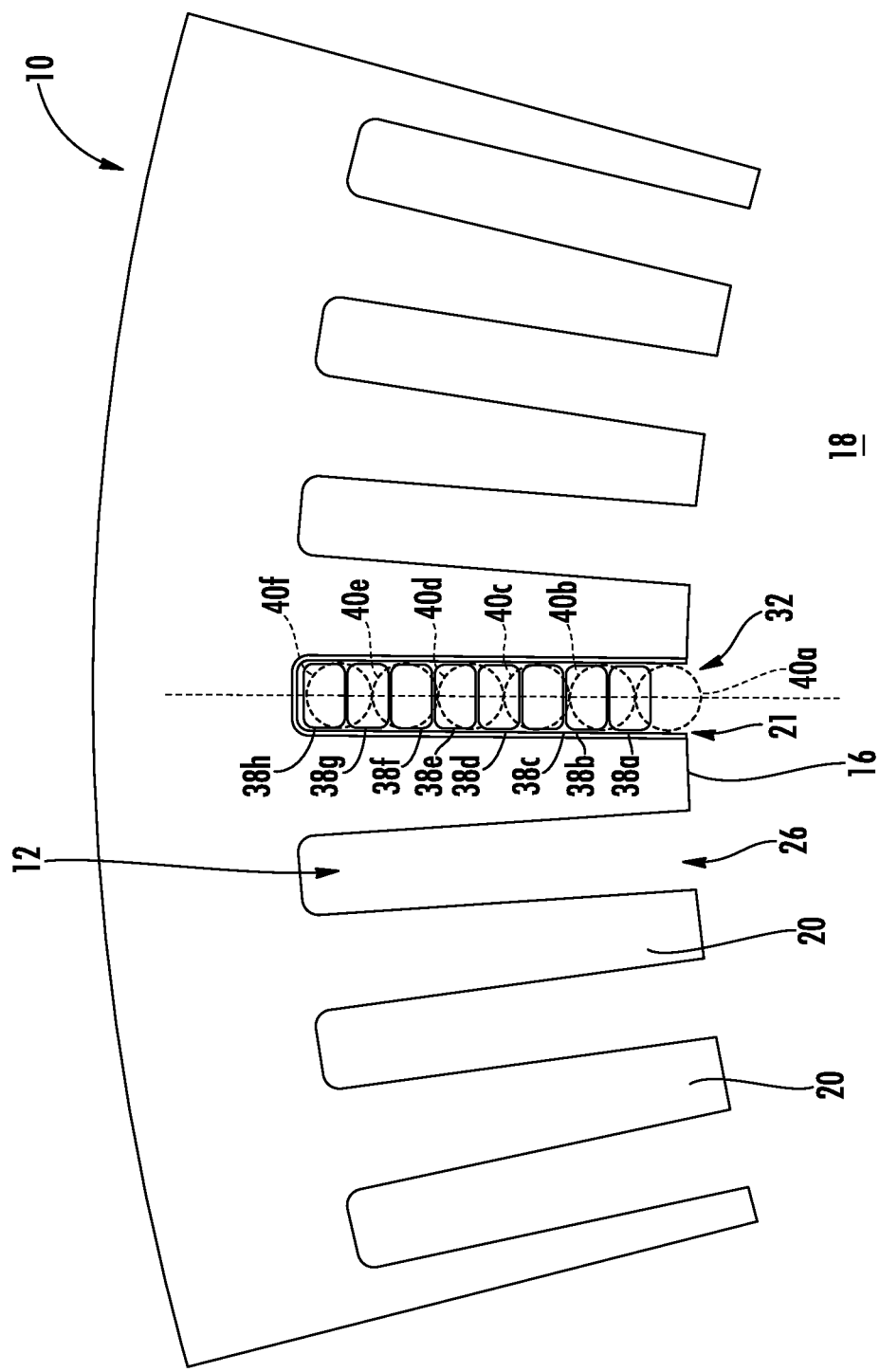
FIG. 4 shows the core of FIG. 2 overlaid with round conductors to illustrate the incompatibility of the core to alternatively accommodate both rectangular and round conductors.

It has additionally been determined that for a six wire-in-a-slot stator with round wires, it is desirable to have about a 0.5 mm clearance from the circumferential inner surface 16 to the innermost conductor in the radial outward direction (i.e., rectangular conductor 38a in FIGS. 2 and 3). FIG. 4 depicts the core 10 of FIG. 2 overlaid with six round conductors 40a-f in the sleeve slot 32. For clarity, the rectangular conductors 38a-h are illustrated using solid lines while the round conductors are illustrated using dashed lines. The round conductors 40a-f each have a diameter Ø that is approximately equal to the width $W_{RCS}$ of the rectangular conductors 38a-h. As used herein, a first dimension that is "approximately equal to" or that "approximates" a second dimension means the first dimension is within a narrow dimensional range measured from the second dimension. For example, a round conductor 40a-f with a diameter Ø of 2.0 mm is not approximately equal to a rectangular conductor 38a-h with a width $W_{RCS}$ of 1.6 mm, whereas a round conductor 40a-f with a diameter Ø of 1.575 mm is approximately equal to a rectangular conductor 38a-h with a width $W_{RCS}$ of 1.6 mm. As is shown in FIG. 4, the innermost round conductor 40a has no clearance from circumferential inner face 16 in the radial outward direction. Instead, the innermost round conductor 40a extends in the radial inward direction from the circumferential inner face 16. Thus, the slot design of the prior art core 10 does not sufficiently accommodate both rectangular wires and round wires in alternative applications under the aforementioned preferred conditions.

Figure 5:
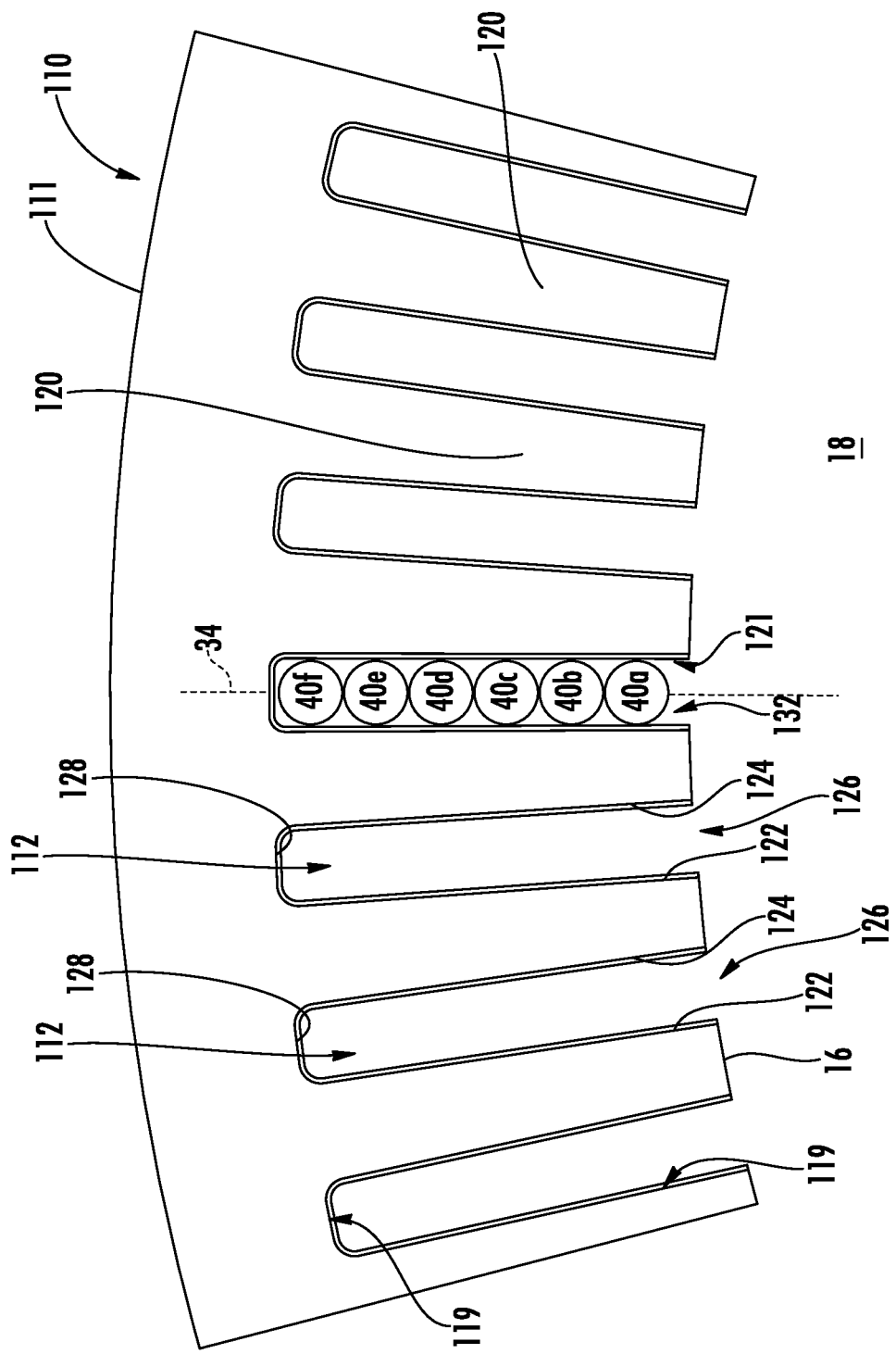
FIG. 5 shows a cross-sectional portion of a core in accordance with the present invention with at least one slot of the core including a plurality of round conductors.
Figure 6:
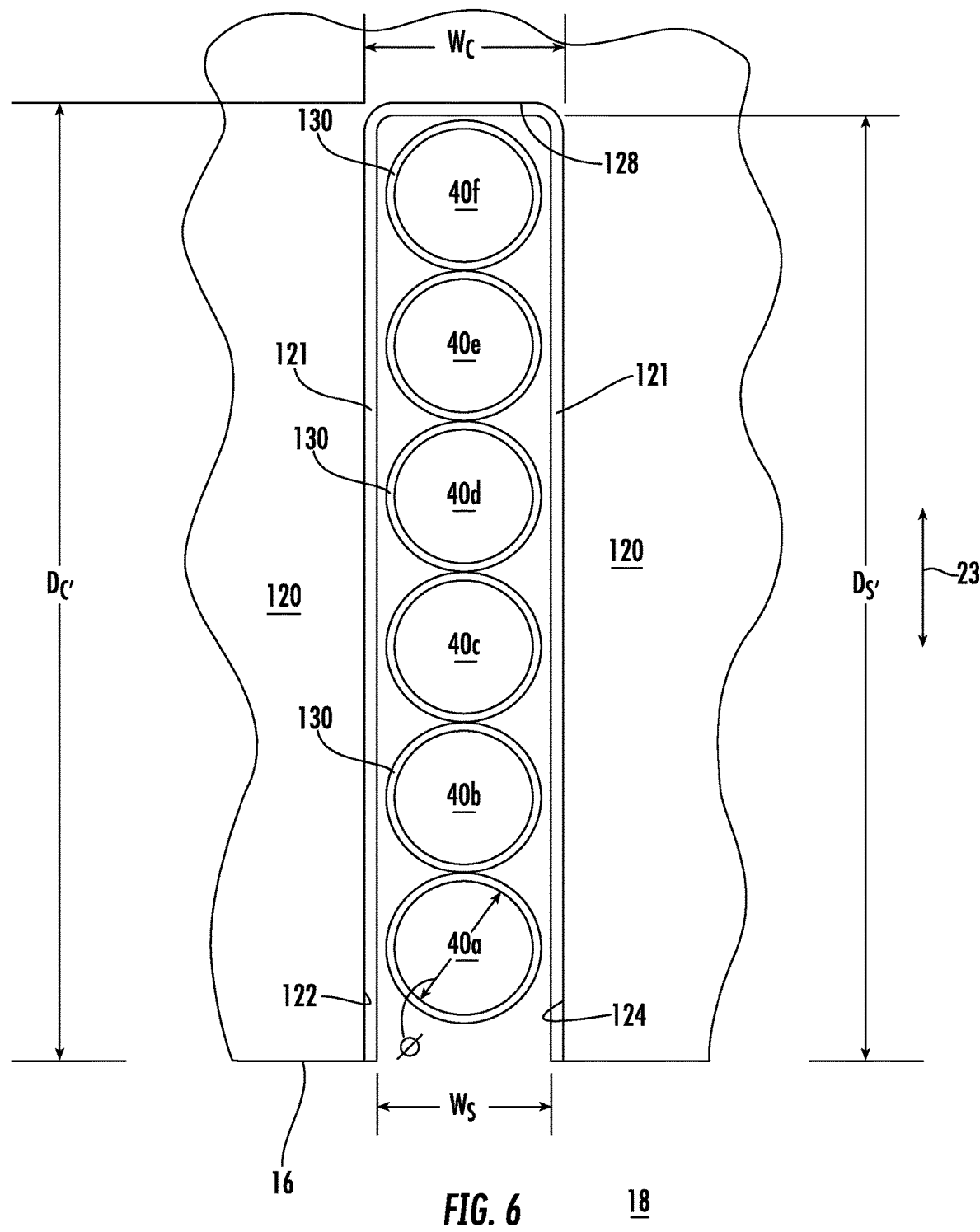
FIG. 6 shows enlarged view of the slot of FIG. 5 illustrating the features of the slot and the round conductors in more detail.

FIGS. 5 and 6 show a core 110 for use in a three-phase electrical machine and configured to accept both rectangular conductors (i.e., 38a-h shown in FIGS. 2 and 3) and round conductors 40a-f in alternative applications. The core wound with rectangular conductors may sometimes be referred to herein as a "first configuration", while the core wound with round conductors may sometimes be referred to herein as a "second configuration" although the structure of the core is identical in both the first and second configurations. The core 110 also has the advantage that a desired clearance between the circumferential inner surface 16 and the innermost conductor (i.e., rectangular conductor 38a in FIGS. 2 and 3 and round conductor 40a in FIGS. 5 and 6) results with either conductor geometry. In FIGS. 5 and 6, elements of the core 110 that are similar to those of the core 10 of FIGS. 1-4 are identified with like numerals whereas new or changed elements are identified with a single prime symbol or by incrementing the prior reference number by 100. As used hereafter, the terms "rectangular conductor", "rectangular wire", or the like refer to a conductor with a rectangular, non-square cross-sectional geometry when viewed along a cross-sectional plane situated perpendicular to the central axis 14 of the core 110.

The core 110 has a core body 111 that includes a number of core slots 112 arranged about the central axis 14 with each of the core slots 112 associated with one of the three current phases. This association progressively repeats itself in sequence around a circumferential inner surface 16 of the core 110, which defines a substantially cylindrical bore 18 through the core 10. The core slots 112 extend parallel to the central axis 14 of the core 110 between the first end 15 and the second end 17 thereof. The core slots 112 are equally spaced around the circumferential inner surface 16 of the stator core 110 and are substantially parallel to the central axis 14. The core slots 112 have a depth $D_C{}'$ (FIG. 6) along the radial axis 23 (FIG. 1).

The core 110 in the illustrated embodiment is formed of a stack of aligned, interconnected electrical steel laminae, which define the circumferential inner surface 16 and the core slots 112. The core in other embodiments can be formed in any other known manner. The following features described with reference to the "core" or "core body" also describe features of individual lamina since the stack of laminae forms the core 110. The core slots 112 are separated from one another by stator poles or teeth 120 formed by the lamina stack. As viewed axially along the arrow 13 (FIG. 1), the longitudinal inner surfaces 119 of the core slots 112 are generally U-shaped with approximately parallel sides 122, 124. The core slot sides 122, 124 extend in the radial outward direction from the slot opening 126 in the circumferential inner surface 16. As best shown in FIG. 6, the depth $D_C{}'$ of each core slot 112 extends from the slot opening 126 at the circumferential inner surface 16 to a core slot bottom 128 that is spaced in the radial outward direction from the slot opening 126.

The core slots 112 are each fitted with respective insulation sleeves 121 that electrically insulate the round conductors 40a-f positioned in the core slots 112 from the core 110. As discussed with reference to FIG. 4, the diameter Ø of the round conductors 40a-f is approximately equal to the width $W_{RCS}$ of the rectangular conductors 38a-h depicted in FIGS. 1-3. Similarly, the cross-sectional area of each of the round conductors 40a-f is substantially equal. The round conductors 40a-f are aligned in a single row by the respective parallel sides 122, 124 of the core slots 112.

FIG. 6 shows an enlarged cross-sectional view of one of the core slots 112 of the core 110 with the six round conductors 40a-f positioned therein. In the configuration shown, each conductor 40a-f is separated from neighboring conductors in the core slot 112 by at least one insulation layer 130 and from the core 110 by the insulation sleeve 121. The insulation layer 130 and the insulation sleeve 121 each have a substantially uniform thickness. The diameter Ø of each of the round conductors 40a-f referred to herein includes the thickness of the insulation layer 130. In the embodiment shown, the diameter Ø is approximately 1.6 mm. As shown in FIG. 6, the insulation sleeve 121 is positioned along the parallel sides 122, 124 and the core slot bottom 128 so as to substantially surround the conductors 40a-f in each of the slots 112 and thus defines a sleeve slot 132 with a sleeve slot width $W_S$ and a sleeve slot depth $D_S{}'$.

Since the diameter Ø of the round conductors 40a-f is approximately equal to the width $W_{RCS}$ of the rectangular conductors 38a-h, the sleeve slot width $W_S$ at the slot openings 26 can be the same for both the cores 10 and 110. Similar to the core 10, the circumferential spacing between the adjacent teeth 120 of core 110 may be consistent along the depth $D_C$ or the circumferential spacing may widen slightly in the radial outward direction from the opening 26 to a width $W_C$ of the core slot 112 defined between the interfacing parallel sides 122, 124 of the circumferentially adjacent teeth 120. The stator winding may be prepared using any variation of a conventional technique suitable for round wire, and the round conductors 40a-fh are inserted either individually or as a group into their respective core slot 112 through its opening 26.

When viewed along a cross-sectional plane situated perpendicular to the central axis 14, each core slot 112 and sleeve slot 132, and the common opening 26 thereto are centrally positioned about the slot radial centerline 34 (FIG. 5). The difference in the core slot width $W_C$ and the sleeve slot width $W_S$ is substantially equivalent to twice the thickness t (i.e., 2t) of the insulation sleeve 121 that lines the core slot 112 and defines the interior of the sleeve slot 132. The insulation sleeve 121 of FIGS. 5 and 6 is formed from the same material as the insulation sleeve 21 of FIGS. 2 and 3. As such, the sleeve slot width $W_S$ is approximately equal to the slot width $W_C$ minus two times the thickness t of the insulation sleeve 121 (i.e., $W_S=W_C-2t$), and approximates the diameter Ø of the round conductors 40a-f with similar clearances as were noted with the rectangular conductors 38a-h. Thus, a single file arrangement of the round conductors 40a-f is maintained along the depth $D_S'$ of the sleeve slot 132 with circumferential surfaces of the arranged round conductors 40a-f aligned along the slot radial centerline 34 and in abutment with one another.

As noted above, it is desirable to have about a 0.5 mm clearance from the circumferential inner surface 16 of core 110 to the innermost conductor in the radial outward direction (i.e., round conductor 40a in FIGS. 5 and 6). To approximate this clearance in the core 110, the sleeve slot depth $D_S'$ (FIG. 6) is between N times the round wire diameter plus 0.2 ((N*wire diameter)+0.2) and N plus 1 times the round wire diameter ((N+1)*wire diameter) where N=the number of wires in the core slot 112. Thus, the relationship between the diameter Ø of the round conductors 40a-h and the sleeve slot depth $D_S'$ can be stated as:

$$(N*\text{wire diameter})+0.2 \leq D_S' \leq (N+1)*\text{wire diameter}.$$

Thus, for the core 110 to be wound with a round conductor having a diameter of 1.6 mm with six conductors per slot, the sleeve slot depth $D_S'$ is between 9.8 mm ((6*1.6)+0.2) and 11.2 mm ((6+1)*1.6). Similarly, for the core 110 to wound with a round conductor having a smaller diameter, for example 1.3 mm, with fewer conductors per slot, for example 5 conductors per slot, the sleeve slot depth $D_S'$ is between 6.7 mm ((5*1.3)+0.2) and 7.8 mm ((5+1)*1.3). Based on this relationship, the core 110 including a round conductor with six conductors per slot and a diameter that is approximately equal to the width of a rectangular conductor that can also be accommodated has a sleeve slot depth $D_S'$ which is approximately 10% longer than the sleeve slot depth $D_S$ in the core 10.

With this slot design, round wire can be inserted in a single row in the core 110 and the slot fill factor will remain rather high at approximately 0.56 (or 56% slot fill) (FIG. 6) as compared to the core 10 with rectangular wire at approximately 0.62 (or 62% slot fill) (FIG. 3). The slot fill factor of the core in the second configuration is 9.7% ((0.62−0.56)/0.62)—or within 10%—of the slot fill factor of the core in the first configuration. The slot fill factor in the embodiment described is determined without deformation of the wires in the core by external force. Thus, the slot design of the core 110 provides a single lamination design for two, separate stator designs: a high slot fill version using round wire and a very high slot fill version using square wire. As is known in the art, slot fill factor is equal to the ratio of the conductor area (or volume) over the total slot area (or volume). For example, a slot fill factor of 0.5 would signify that half (50%) of the slot area (or volume) is occupied by the conductors. The other half of the slot area (or volume) is occupied by conductor insulation, slot insulation, and gaps in between the conductors and between the conductors and the slots sides.

Figure 7:
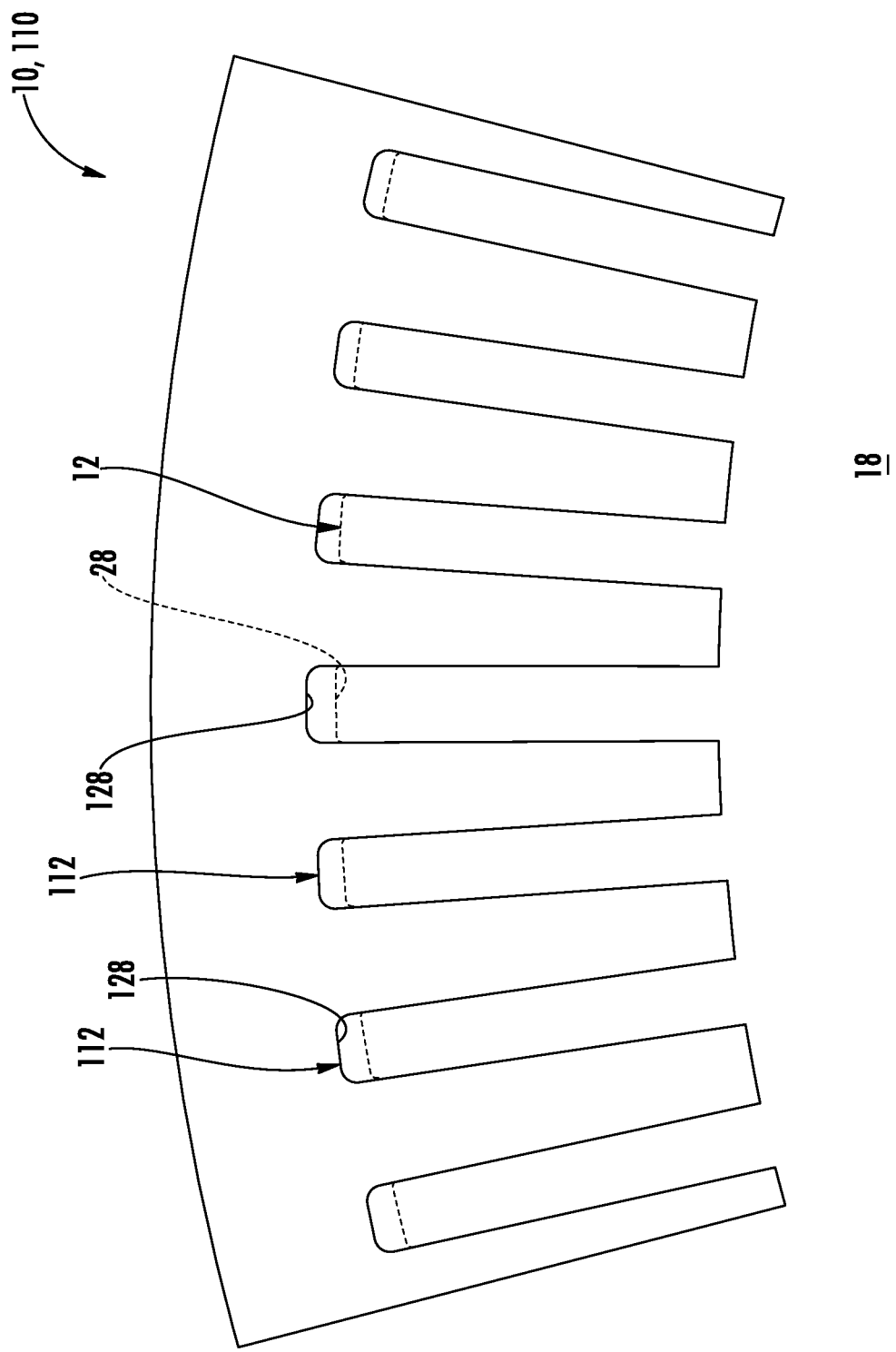
FIG. 7 shows an overlay of the core of FIG. 2 and the core of FIG. 5 with a bottom of the slots of the core of FIG. 2 shown in phantom lines.

FIG. 7 shows an overlay of the core 10 of FIG. 2 and the core 110 of FIG. 5 with the core slot bottom 28 of the core 10 shown in phantom lines. As shown in FIG. 7, the relationship between the sleeve slot depth $D_S$ and the diameter of the round conductor established above results in an elongation of the core slot 112 in the outer radial direction. Specifically, the core slot bottom 28 of the core 10 is adjusted from the positioned depicted by the phantom lines to the position of the core slot bottom 128 of the core 110. As discussed above, the elongated core slots 112 enable the core 110 to accept both rectangular conductors (i.e., 38a-h shown in FIGS. 2 and 3) and round conductors 40a-f (i.e., 40a-f shown in FIGS. 5 and 6) in alternative applications.

Figure 8:
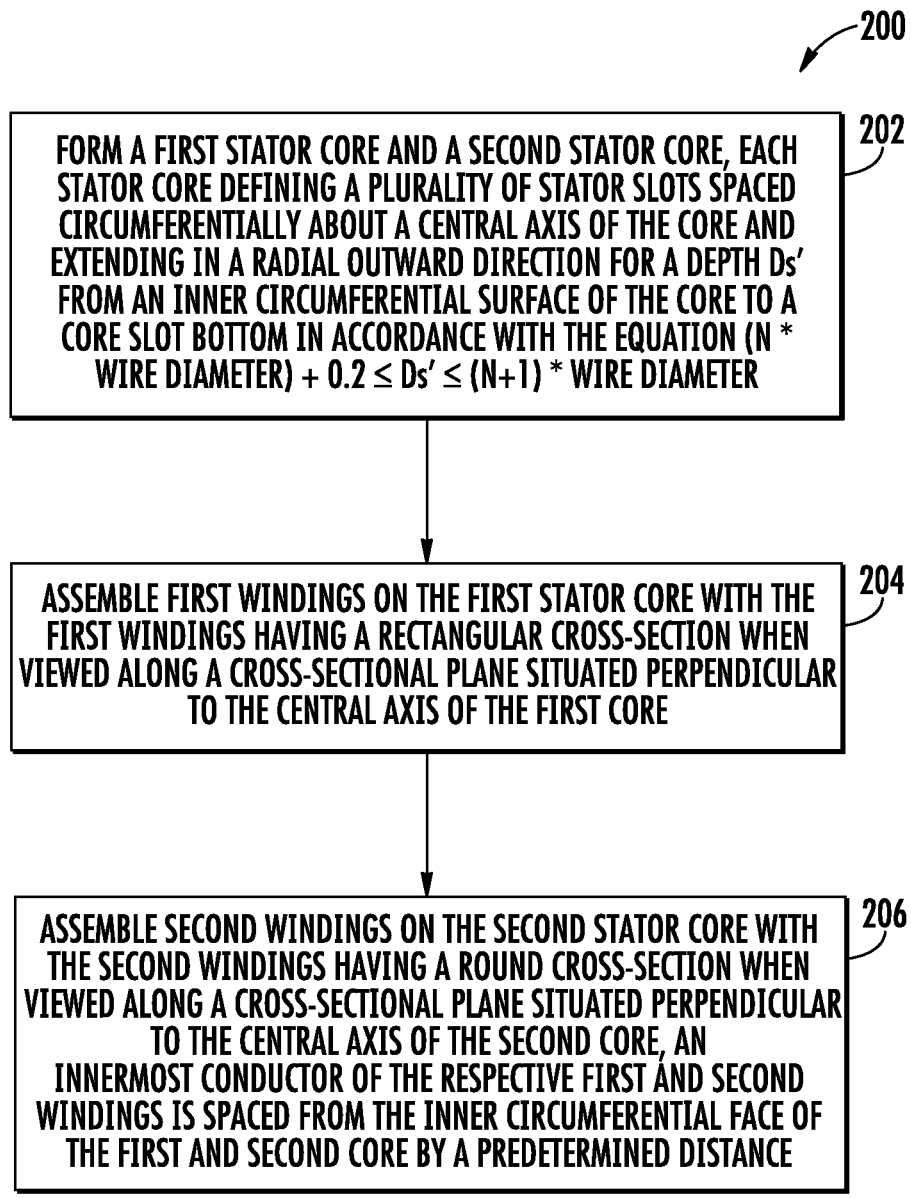
FIG. 8 shows a flow diagram of a method for producing a first core assembly with rectangular conductors and second core assembly with round conductors using the core of FIG. 5.

A flow diagram of a method 200 for forming stator assemblies for electrical machines is shown in FIG. 8 and described with reference to FIGS. 2-6. The method begins by forming a plurality of identical stator cores including a first stator core $110_1$ and a second stator core $110_2$, each stator core $110_1$, $110_2$ defining a plurality of stator slots $112_1$, $112_2$ spaced circumferentially about a central axis 14 of the core and extending in a radial outward direction for a depth $D_S'$ from an inner circumferential surface 16 of the core to a core slot bottom $128_1$, $128_2$ in accordance with the equation (N*wire diameter)+0.2≤$D_S'$≤(N+1)*wire diameter (block 202). In this description of the method 200, subscripts are used after the reference numbers to distinguish identical features of the first and second stator cores.

First windings 38a-h are assembled on the first stator core $110_1$ with the first windings having a rectangular cross-section when viewed along a cross-sectional plane situated perpendicular to the central axis 14 of the first core $110_1$ (block 204). Second windings 40a-f are assembled on the second stator core $110_2$ with the second windings having a round cross-section when viewed along a cross-sectional plane situated perpendicular to the central axis 14 of the second core $110_2$ (block 206). The first windings 38a-h are disposed in a single row within the first slots $112_1$ of the first core $110_1$, while the second windings 40a-f are disposed in a single row within the second slots $112_2$ of the second core $110_2$. An innermost conductor 38a, 40a of the respective first and second windings 38a-h, 40a-f is spaced from the inner circumferential face 16 of the first and second core $110_1$, $110_2$ by a predetermined distance. The first stator core assembled with the first windings has a first slot fill factor and the second stator core assembled with the second windings has a second slot fill factor. The second slot fill factor is within 10% of the first slot fill factor.

The foregoing detailed description of one or more embodiments of the stator core has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method of producing a plurality of stator assemblies, comprising:

forming a plurality of identical cores, each core including a core body having a plurality of teeth, adjacent teeth of the plurality of teeth defining respective slots in the core body, the plurality of identical cores including at least a first core and a second core;

winding the first core of the plurality of identical cores with a first plurality of elongate wire segments, the first wire segments having a rectangular cross section and arranged in single file within in each slot, the rectangular cross section having a cross-sectional dimension that approximates a slot width of the slot; and winding the second core of the plurality of identical cores with a second plurality of elongate wire segments, the second wires segments having a round cross section and arranged in single file within each slot, the round cross section having a diameter that approximates the slot width, wherein the wound first core has a first slot fill factor and the wound second core has a second slot fill factor that is different than the first slot fill factor.

2. The method of claim 1 wherein the second slot fill factor is within 10 percent of the first slot fill factor.

3. The method of claim 1 wherein each slot defines a slot depth in a respective direction along which the teeth extend from the core body and the teeth are spaced circumferentially from each other by the slot width, and wherein the slot depth has a range defined by the equation $$(N*\varnothing)+0.2 \leq DC' \leq (N+1)*\varnothing$$

where DC' is the slot depth, N equals the number of the second wire segments in each slot of the second core, and $\varnothing$ equals the diameter of the second wire segments.

4. The method of claim 1, wherein distal end faces of the plurality of teeth define a circumferential face of the core body, and wherein a distal-most segment of the second wire segments has a minimum clearance to the circumferential face of the second core.

5. The method of claim 4, wherein the minimum clearance of the distal-most segment of the second wire segments to the circumferential face is 0.5 mm.

6. The method of claim 1, further comprising arranging a plurality of insulation sleeves respectively in each of the slots, the insulation sleeves having a substantially uniform thickness, wherein the round cross section having a diameter that approximates the slot width (WC) more specifically approximates the slot width minus twice the thickness (t) of the insulation sleeves (WC−2t).

7. The method of claim 6, wherein:
the first wire segments have a first insulation layer with a substantially uniform thickness, the cross-sectional dimension of the first wire segments including the thickness of the first insulation layer, and
the second wire segments have a second insulation layer with a substantially uniform thickness, the diameter of the second wire segments including the thickness of the second insulation layer.

8. The method of claim 1, wherein the number of first wire segments in each of the slots of the first core is eight, and wherein the number of second wire segments in each of the slots of the second core is six.

9. The method of claim 8, wherein the first slot fill factor is 0.62 and the second slot fill factor is 0.56.

10. A method of manufacturing a stator for an electric machine, the stator including a core body having a plurality of teeth, adjacent teeth of the plurality of teeth defining respective slots in the core body, each slot having a slot depth in a respective direction along which the teeth extend from the core body and a slot width in a respective direction along which the teeth are spaced circumferentially from each other, the method comprising:

determining a first core body configuration wherein a plurality of elongate first wire segments having a rectangular cross section are arranged in single file within in each slot, the rectangular cross section having a cross-sectional dimension that approximates the slot width;

determining a second core body configuration wherein a number of elongate second wire segments having a round cross section are arranged in single file within each slot, the round cross section having a diameter that approximates the slot width;

calculating a slot depth ($D_C'$) for the core body in both the first core body configuration and the second core body configuration, the slot depth having a range defined by the equation $$(N*\varnothing)+0.2 \leq D_C' \leq (N+1)*\varnothing$$

where N equals the number of the second wire segments in the slot and $\varnothing$ equals the diameter of the second wire segments in the second configuration;

manufacturing a first core body with the first core body configuration wherein each of the first wire segments have a first insulation layer separating the conductor from neighboring conductors in the slot, the cross-sectional dimension of the first wire segments including the thickness of the first insulation layer, the first core body having a first slot fill factor; and manufacturing a second core body with the second core body configuration stator with the second core body configuration wherein each of the second wire segments have a second insulation layer separating the conductor from neighboring conductors in the slot, the diameter of the second wire segments including the thickness of the second insulation layer, the second core body having a second slot fill factor, the second slot fill factor different from the first slot fill factor.

11. The method of claim 10 wherein eight first wire segments are positioned in each of the slots in the first core body configuration, and wherein the number of second wire segments in each of the slots is six in the second core body configuration.

12. The method of claim 10, wherein the first slot fill factor is 0.62 and the second slot fill factor is 0.56.

13. The method of claim 10, wherein a minimum clearance of a distal-most segment of the second wire segments to the circumferential face is 0.5 mm.

14. The method of claim 10 wherein the second slot fill factor is within ten percent of the first slot fill factor.

* * * * *